United States Patent [19]

Li

[11] Patent Number: 4,664,539
[45] Date of Patent: May 12, 1987

[54] SERIAL SAFETY BEARING

[75] Inventor: Paul Z. Li, Tallahassee, Fla.

[73] Assignee: Florida State University, Tallahassee, Fla.

[21] Appl. No.: 829,080

[22] Filed: Feb. 13, 1986

[51] Int. Cl.⁴ .................. F16C 41/00; F16C 19/50; F16C 19/56

[52] U.S. Cl. .................. 384/624; 384/102; 384/448; 384/461

[58] Field of Search ............... 384/101, 102, 448, 461, 384/624; 192/48.91, 110 B

[56] References Cited

U.S. PATENT DOCUMENTS

| | | | |
|---|---|---|---|
| 1,366,966 | 2/1921 | Spear | 384/520 X |
| 1,433,014 | 10/1922 | Kennedy | 384/461 |
| 1,494,695 | 5/1924 | McCluskey | 384/461 |
| 1,506,856 | 9/1924 | McCluskey | 384/461 |
| 1,742,841 | 1/1930 | Witthofft | 384/461 |
| 1,748,174 | 2/1930 | Hirvonen | 384/461 |
| 2,647,807 | 8/1953 | Brunstrum | 384/461 |
| 3,452,349 | 6/1969 | Wood | 384/448 X |
| 3,597,029 | 8/1971 | Marcum | 384/461 |
| 3,603,654 | 9/1971 | Bird | 384/102 |
| 3,642,331 | 2/1972 | Silver | 384/102 |
| 4,045,100 | 8/1977 | Beauchet | 384/461 |
| 4,425,010 | 1/1984 | Bryant | 384/624 X |

Primary Examiner—Stuart S. Levy
Assistant Examiner—Thomas R. Hannon
Attorney, Agent, or Firm—Dennis P. Clarke

[57] ABSTRACT

Serial safety bearing assembly includes two concentric bearing sets and an actuatable device for selectively switching to engage either the inner or the outer of the two concentric bearing sets upon failure of one set or to alternate to first one set and then the other set thus to prolong the working life of the two concentric bearings.

15 Claims, 12 Drawing Figures

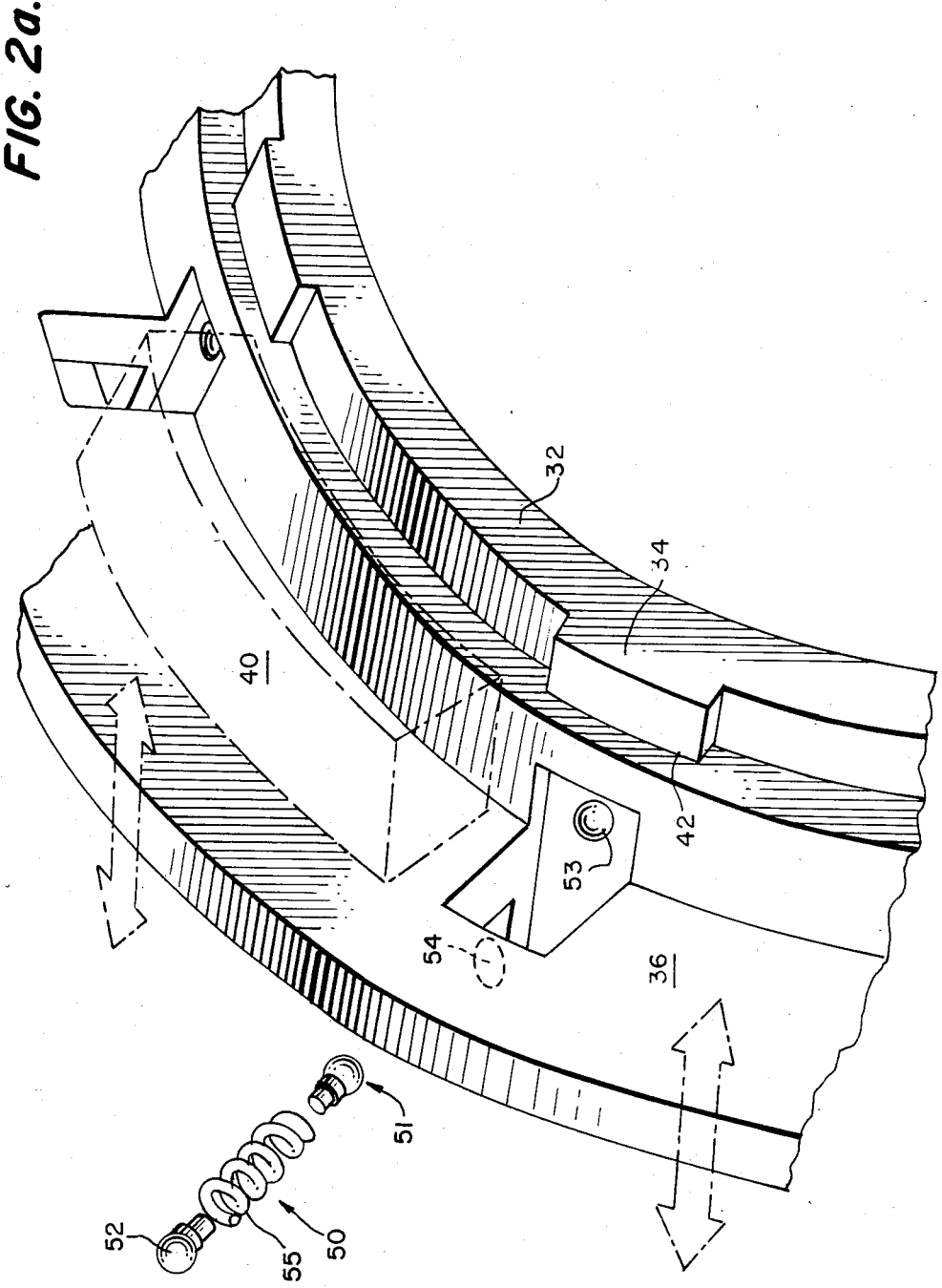

SERIAL SAFETY BEARING

BACKGROUND OF THE INVENTION

This invention relates to bearings and, more particularly, bearing assemblies having bearings arranged in serial fashion.

The use of anti-friction bearings is well-known. Such bearings permit free relative motion between different parts of a machine. The bearings may hold or guide moving machine parts, while simultaneously minimizing energy-wasteful friction. Additionally, the bearings minimize wear on the machine parts, which wear may change the dimensions of the machine parts rendering them useless.

The operation of bearings are limited by at least two factors. Specifically, the work specification for a high load, high speed bearing is usually specified by the product of the maximum total load P times the maximum speed V. For a bearing with a given PV value, one can increase the working speed under a reduced load and, likewise, one can increase the load under a reduced speed. However, in either case of reducing the speed or the load, certain maximum limits of speed and load also apply.

When a bearing is used in a particularly high speed or high load application, special materials and constructions have often been used in order to minimize the possibility of failure of the bearing. However, such special materials, extra high quality tolerance levels, or other special constructions are often quite costly. Further, special arrangements or constructions are often complex, difficult to assemble, and subject to other disadvantages. Notwithstanding these elaborate precautions, for a bearing assembly having a single bearing mechanism, binding or jamming of the bearing mechanism results in complete failure of the bearing assembly.

In order to deal with high speed bearing requirements, various compound bearing arrangements have been developed. Such bearing arrangements use at least two sets of bearings, each set bearing between two different surfaces.

The following U.S. patents are illustrative of bearing designs including a plurality of sets of bearings:

| U.S. Pat. No. | INVENTOR | ISSUE DATE |
| --- | --- | --- |
| 1,366,966 | Spear | Feb. 1, 1921 |
| 1,433,014 | Kennedy | Oct. 24, 1922 |
| 1,494,695 | McCluskey | May 20, 1924 |
| 1,506,856 | McCluskey | Sep. 2, 1924 |
| 1,748,174 | Hirvonen | Feb. 25, 1930 |
| 1,742,841 | Witthofft | Jan. 7, 1930 |
| 2,647,807 | Brunstrum | Aug. 4, 1953 |
| 3,452,349 | Wood | Jun. 24, 1969 |
| 3,597,029 | Marcum | Aug. 3, 1971 |
| 4,045,100 | Beauchet | Aug. 30, 1977 |

The Spear patent shows a roller conveyor wherein the rollers are mounted upon a ball-bearing assembly having a plurality of ball bearings radially spaced and disposed upon opposite sides of a member.

The Kennedy patent shows a compound bearing assembly having two sets of ball bearings at opposite ends of a front axle of an automobile. Each set of ball bearings is axially and radially spaced from an adjacent set of ball bearings. An alternate compound bearing uses ball bearings which are radially spaced, but in a common plane.

The McCluskey U.S. Pat. No. 1,494,695 shows a bearing arrangement using a plurality of radially spaced roller bearings disposed in a common plane.

The McCluskey U.S. Pat. No. 1,506,856 shows a radial serial bearing having ball inlets to facilitate insertion of ball bearings in the assembly.

The Hirvonen patent shows a compound bearing arrangement for a spindle. Gears and eccentrics are used to minimize wear.

The Witthofft patent disloses a bearing arrangement having a plurality of radially spaced balls in a concentric arrangement and having a radially movable locking member to lock the ball bearings in position.

The Brunstrum patent shows a bearing arrangement using a plurality of concentrically arranged ball bearings and having a structure such that one set of bearings is used when the shaft is turning in one direction and the other set of bearings is used when the shaft is turning in the opposite direction.

The Wood patent shows a plurality of concentrically arranged ball bearings. The arrangement includes a mechanism whereby one set of the ball bearings is held in reserve and only used upon failure of the other set of ball bearings. The Marcum patent discloses a planetary bearing assembly wherein a plurality of radially spaced bearings are used for high speed installations.

The Beauchet patent discloses a concentric anti-friction bearing assembly wherein bearing elements running in races of different diameters are disposed approximately in the same radial plane.

Additionally, the French patent No. 1,283,704 of Gatserelia issued on July 4, 1962 shows different arrangements in which various pluralities of ball bearings are radially offset in concentric planes and/or disposed in parallel planes. As shown in FIG. 2, three sets of bearings may be arranged concentrically in a common plane with three additional sets of bearings arranged concentrically in another plane axially offset from the first plane.

Although the above and other bearing designs have been generally useful at minimizing friction, they have been subject to numerous disadvantages. In particular, the cost, ease of construction, and operational characteristics have often been less than desirable.

SUMMARY OF THE INVENTION

A primary object of the present invention is to provide a new and improved serial safety bearing assembly.

A more specific object of the present invention is to provide a serial safety bearing assembly including two concentric bearing sets and means for selectively switching to engage either the inner or the outer of the two concentric bearings sets either upon failure of one set or alternatively to first one set and then the other set thus to prolong the working life of the whole assembly.

A still further object of the present invention is to provide a bearing assembly wherein failure of a single bearing means, such as a single set of ball bearings rolling in common races, will not result in complete failure of the assembly.

Yet another object of the present invention is to provide a bearing assembly which may be realized by use of different anti-friction methods such as ball-bearings or other roller elements.

The above and other objects of the present invention which will become apparent as the description proceeds are realized by a serial safety bearing assembly comprising (a) a first member having a first bearing surface; (b)

a second member having a second bearing surface, the first member being movable relative to the second member; (c) an intermediate member movable relative to the first member and to the second member, the intermediate member having a first intermediate bearing surface facing the first bearing surface and a second intermediate bearing surface facing the second bearing surface; (d) first bearing means between the first bearing surface and the first intermediate bearing surface to allow relative movement between the first bearing surface and the first intermediate bearing surface; (e) second bearing means between the second bearing surface and the second intermediate bearing surface to allow relative movement between the second bearing surface and the second intermediate bearing surface; and (f) mechanical, electrical or chemical means to be activated upon failure of one bearing set, or actuatable after a predetermined period of time or alternatively to transfer relative movement between the first and the second bearing means.

In a preferred embodiment the first and second members are annular. Each of the first bearing surface, second bearing surface, first intermediate bearing surface, and second intermediate bearing surface is annular and have a common central axis, the first member is rotatable relative to the second member and the intermediate member is rotatable relative to the first member and rotatable relative to the second member.

BRIEF DESCRIPTION OF THE DRAWING

The invention will be more particularly described in reference to the accompanying drawings wherein;

FIG. 2a is a fragmentary perspective view of one of the snap-action spring means shown in FIG. 1;

DETAILED DESCRIPTION OF THE INVENTION

Figure 1:
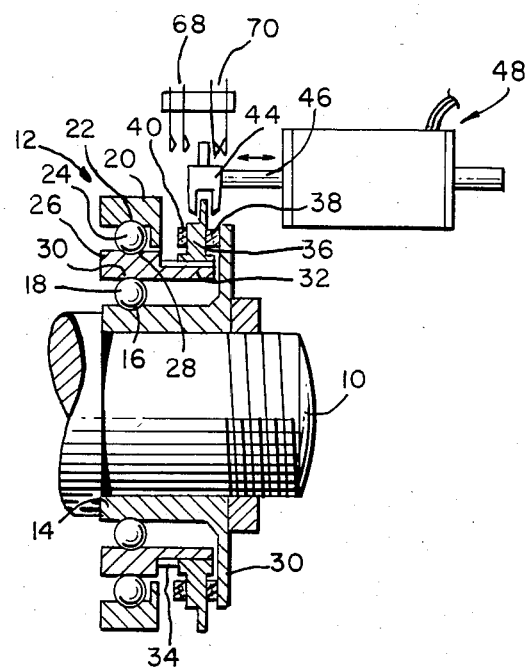
FIG. 1 is a partially sectional view of a bi-directional solenoid activated clutch means for transfer of rotation between first and second safety bearing means.

Referring to FIGS. 1, 2 and 2a, 10 designates a shaft mounted for rotation in the dual safety bearing of the invention generally designated 12. Mounted to rotate with the shaft is a first bearing member 14 having a bearing groove 16 carrying a plurality of anti-friction bearings 18. The assembly includes a second bearing member 20 having a bearing surface 22 within which second anti-friction bearings 24 are mounted. Between the two anti-friction bearings 18 and 20 is an intermediate bearing member 26 having upper and lower bearing surfaces 28 and 30.

The first bearing member 14 has an upstanding cylindrical flange 31 which rotates therewith. The intermediate bearing member 26 has a cylindrical flange 32 having splines 34 on its external surface which splines mount a clutch 36 having a pair of clutch plates 38 and 40 mounted thereon. The clutch plate 36 has spline groves 42 FIG. 2, which mate with the splines 34 on element 32.

The clutch plate is engaged by a shifting fork 44 connected to one end of a shaft 46 associated with a polarized bi-directional solenoid generally designated 48. The clutch-brake disk 38, when in the position illustrated in FIG. 1 engages the clutch plate 30 associated with the inner bearing ring 14 and is held in engagement therewith by a snap action spring assembly generally designated 50 more clearly illustrated in FIG. 2a. When the polarized bi-directional solenoid is actuated in the opposite direction clutch-brake disk 40 engages the clutch-brake plate rotatable with the outer ring 20.

The snap action spring 50 includes a pair of ball joints 51 and 52 which are mounted in the pair of hemispherical pits 53 and 54 by a compressional snap action spring 55. One of the pits 53 is formed in the intermediate splined ring 32 while the other pit 54 is formed in the movable clutch plate 36. In one embodiment of the bi-directional safety bearing there are 6 snap action spring units.

Also, associated with the assembly are a pair of switches 68 and 70 which are connected to indicator lights or the like not shown in FIG. 1, to indicate which of the dual safety bearings is the functional bearing.

With the clutch-brake in the position illustrated in FIG. 1, rotation of the shaft is transferred to the intermediate bearing ring 26 and bearings 18 are not functional, the functional antifriction bearings being 24 as there is relative rotation between the intermediate ring 26 and outer ring 20. When the clutch is in the opposite position there is relative motion between the intermediate ring and the inner ring 14 and bearings 18 become the functional bearings.

In the operation of this form of the invention it is possible to alternate between the pair of serially arranged bearings thus reducing wear and overheating and extending the life of the assembly. It will also be recognized that if either the inner or the outer bearings fail then by shifting the clutch plate on the intermediate ring 26 the failed bearings become a stationary unit.

Figure 2:
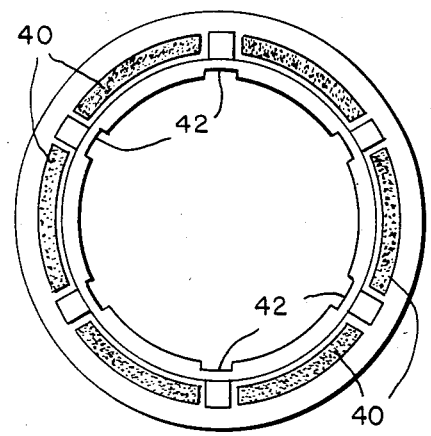
FIG. 2 is a plan view of the transfer ring illustrated in FIG. 1.
Figure 3:
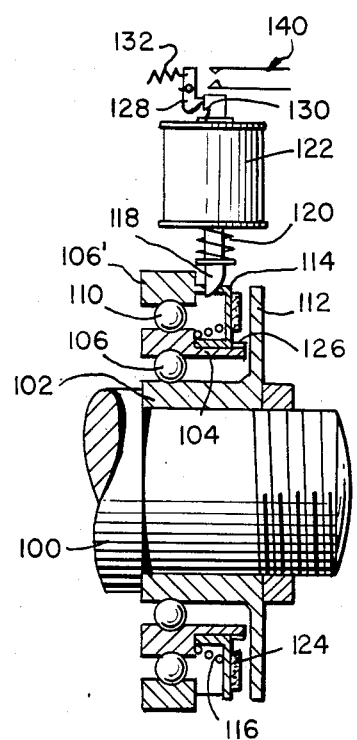
FIG. 3 is a partially sectional view of another form of the present invention wherein rotation is transferred from one bearing set to a second bearing set via a latch which is solenoid controlled.

Referring to FIG. 3 there is shown a serial safety bearing assembly for rotating shaft or axle 100 which bearing assembly includes an inner ring 100, an intermediate ring 104 and outer ring 106. Anti-friction bearing means 108 and 110 are mounted between the inner ring and the intermediate ring and the intermediate and the outer ring. As in the form of the invention shown in FIGS. 1, 2 and 2a the inner ring carries a clutch plate or disk 112. Mounted between the clutch plate 112 and the anti-friction bearings 106 is a clutch member 114 of annular configuration which clutch member is continuously urged toward the clutch plate 112 by spring means 116.

The movable clutch plate 114 is maintained in the position illustrated in FIG. 3 by a latch 118 spring urged into its latched position by coil spring 120. When the solenoid 122 is energized the latch pin 118 moves upwardly and the spring 116 urges the clutch pad 124 into engagement with the clutch plate 112 whereby the cooperating spindle on the intermediate bearing ring and the movable clutch plate 114 (as indicated at 126) causes relative rotation between the intermediate ring 104 and the outer ring 106 thereby bearings 110 become the active bearing and bearing 106 rotates with the inner and intermediate rings 102 and 104.

When the solenoid 112 is actuated locking latch 128 engages the keeper 130 and is maintained in that position by spring 132. In this form of the invention it is not possible to switch back and forth between the two serial safety bearings and the solenoid 122 is only actuated when necessary or after a predetermined time. Also associated with the solenoid 122 is switch designated 140 connected to an indicator light to indicate when the second in series of bearings is the active bearing.

Figure 4:
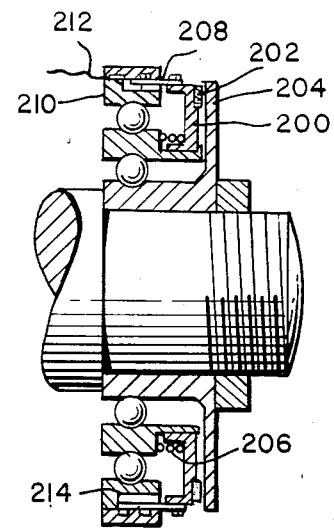
FIG. 4 illustrates in partial section another form of the present invention wherein transfer of rotation from one bearing to the other bearing set is in response to a fused terminal and spring means.

Referring to FIG. 4 of the drawings bearing structures and clutch element as described in references to FIG. 3 are shown including movable clutch plate 200 having a clutch pad 202 to engage clutch ring 204. The movable clutch plate 200 is continuously urged by spring 206 toward the engaged position from its non-engaged position shown in FIG. 4. Removable clutch plate 200 is constrained from movement by a fuse alloy strip 208 associated with the outer ring 210 of the serial bearings. The fuse alloy is fired via electrical wires 212 which are connected to one end of the fuse alloy 208 and insulated by insulator pads 214 from electrical contact with the outer ring 210. Switch means may also be incorporated in the firing mechanism to be connected to an indicator as in the previous forms of the invention. The FIG. 4 form of the invention is comparable to that shown in FIG. 3 in that once the clutch is actuated transferring rotational movement from the first bearing set to the second bearing set the elements or mechanisms are irreversible until such time as reassembly has occured including insertion of a new inner bearing and fuse alloy.

Figure 5:
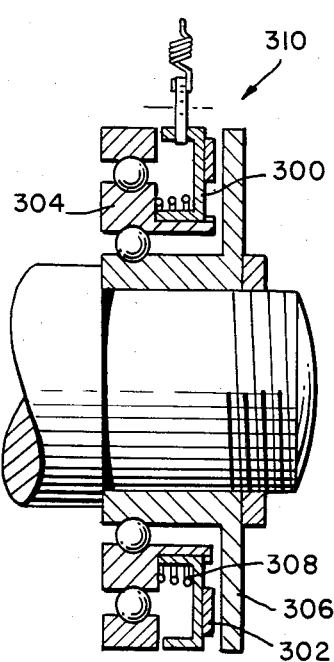
FIG. 5 is a partially sectional view through a further form of serial safety bearing.
Figure 6:
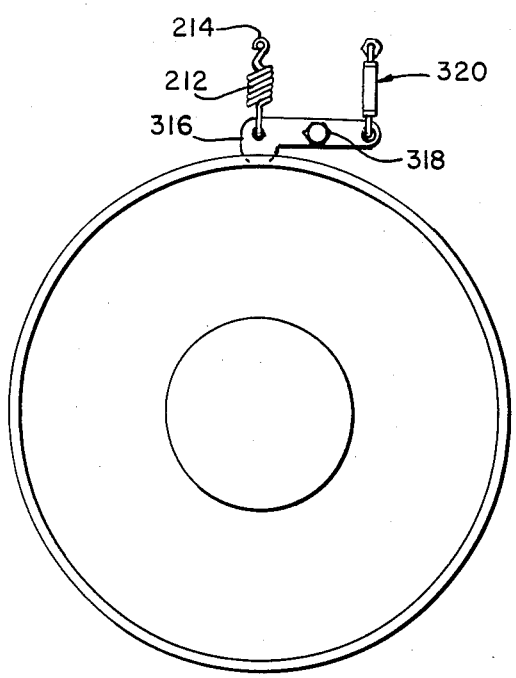
FIG. 6 illustrates an end view of a portion of the structure shown in FIG. 6.

Referring now to FIGS. 5 and 6 another form of actuating mechanism for releasing the movable clutch plate 300 carrying the clutch pad 302 is illustrated. As in the prior form of the invention the movable clutch plate 300 is splined to the intermediate ring 304 and the movable clutch plate 300 is continuously urged toward clutch plate 306 by spring means 308. The movable clutch plate is maintained in the position illustrated in FIGS. 5 and 6 by a latch generally designated 310 which is spring urged out of engagement with the movable clutch plate by a spring 212 anchored at 214 and connected to the latch tongue 316. The latch tongue 316 is pivoted as at 318 and prevented from movement by latch holding element generally designated 320.

Figure 7:
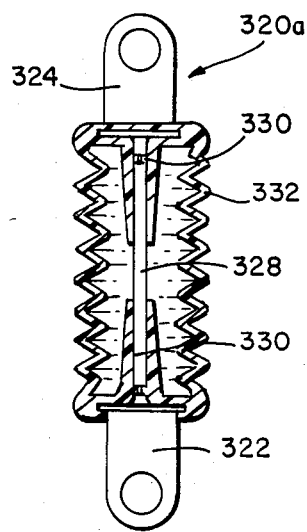
FIG. 7 illustrates in partial section a corrosion bolt type release means for the structure shown in FIGS. 5 and 6.
Figure 8:
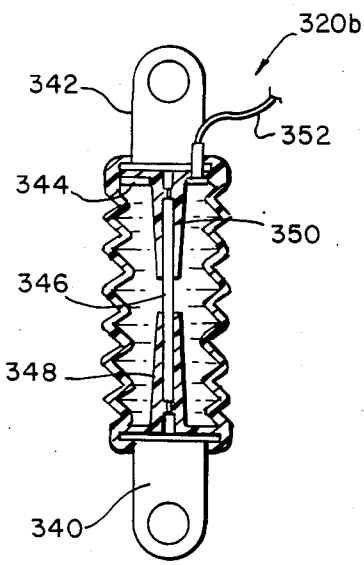
FIG. 8 is a view like FIG. 7 of an electro-chemical release means for the structures shown in FIGS. 5 and 6.
Figure 9:
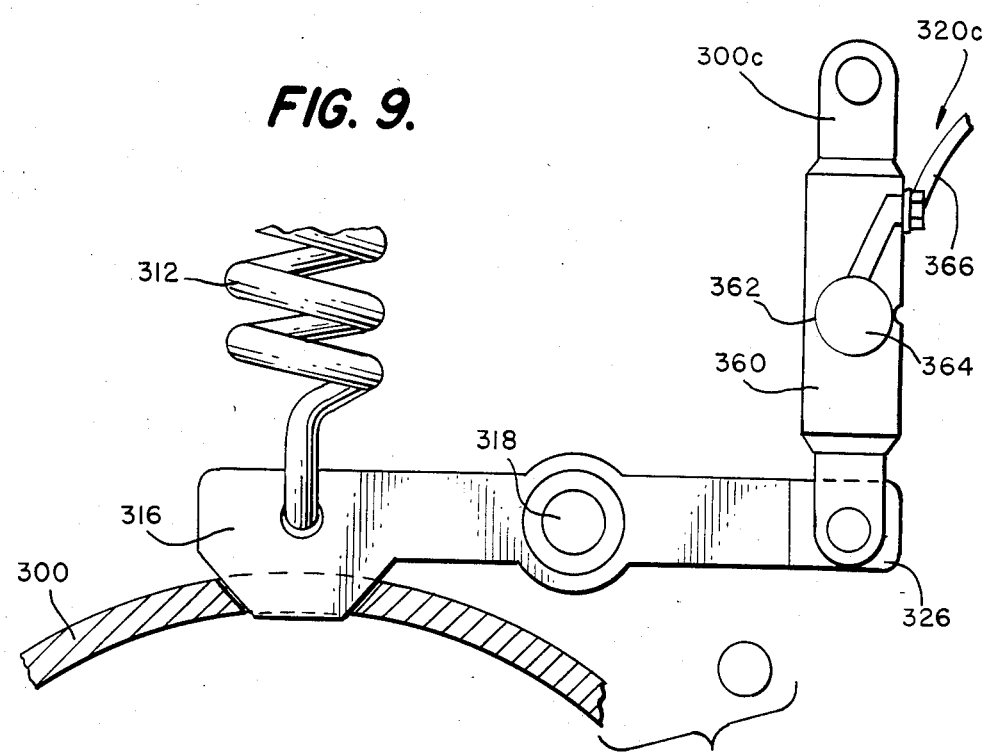
FIG. 9 is an enlarged fragmentary view of another form of release means employing an explosive bolt useful with the structures shown in FIG. 5 and 6.

FIGS. 7, 8 and 9 illustrate three forms of the latch holding-release element designated 320 in FIG. 6 and designated 320a, 320b and 320c in FIGS. 7, 8 and 9, respectively. Referring to FIG. 7 the release element 320a has a pair of spaced ears 322 and 324. Ear 322 is attached at end 326 of the latch tongue 316 while the other end 324 is secured to a rigid element not shown. The two ends 322 and 324 are connected by a metallic rod 328 having zones of weakness such as precut lines 330. The metallic element 328 is surrounded by an elastomeric bellows 332 and within the bellows is a chemical etchant. In operation the thickness of the metallic stem and the type of etchant and its concentration are so selective that the latch is released in a predetermined period of time to switch from the inner bearing to the outer bearing of the series safety bearing assembly.

Referring to FIG. 8 the release element 320b comprises the two end ears or members 340 and 342, a cathode ring 344 and an anode 346. A portion of each end of anode 346 is protected by an insulator 348 at one end and 350 at the other end. The cathode is connected to a cathode lead 352. In this form of the invention where an electric current of microamperes passes through the sealed cell, the wire, working as an anode will lose its metal, molecule by molecule, and be electroplated onto the cathode until the wire breaks under the tensile load of the spring 312. Then the latch will be released and in turn the clutch plate. In the forms shown in FIGS. 7 and 8 the rubber bellows will stretch but continue to maintain the chemicals intact. The FIG. 8 form of the invention is preferable to the FIG. 7 form in that the anode is only destroyed when current is directed to the cathode and means not shown are provided to see that current is only passed to the cathode when the bearing is working.

Referring now to FIG. 9 there is illustrated an exploseiveable type release wherein the explosive bolt is indicated at 360 and the explosive bolt is provided with a precut weak rip band 362. A small amount of explosive charge 364 is connected to a conventional igniter via electric leads 366.

Where desired the explosive bolt form of the invention can be enclosed in a container with flame arrest shields. Upon ignition of the charge the explosive bolt parts at the precut rip band and the spring 312 urges the latched tongue upwardly to engage the clutch such as clutch 300, FIG. 5.

Figure 10:
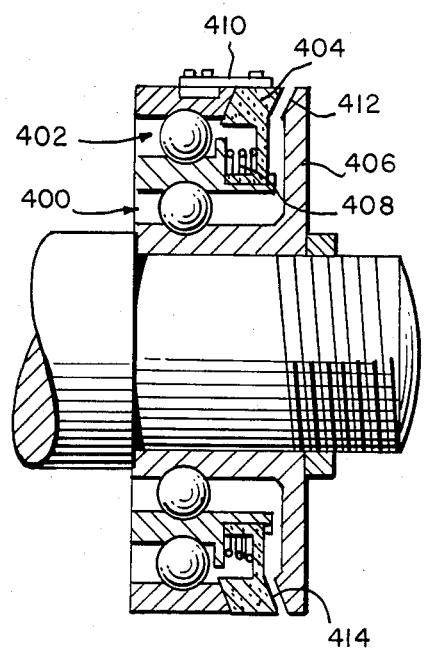
FIG. 10 is a partially sectional view of another form of serial safety bearing having cone shaped frictional surfaces.

Referring now to FIG. 10 there is shown a form of the present invention including serially arranged first and second bearings 400 and 402, a movable clutch element 404 and a fixed clutch member 406. The movable clutch element 404 is urged by spring 408 into engagement with the fixed clutch plate 406 upon release of the movable clutch plate, via soft metal fuse control means 410, such as that discussed in reference to FIG. 4 of the application.

The difference between this form of the invention and that shown in FIG. 4 is that the pair of clutch plates have cone shaped surfaces 412 and 414. The clutch plates with the cone shaped contact surface assure concentricity when the worn-out working bearing has to be caught and held by the transferring clutch plate. This principle, it will be recognized by those skilled in the art, can be employed on each form of the present invention specifically set forth herein.

Figure 11:
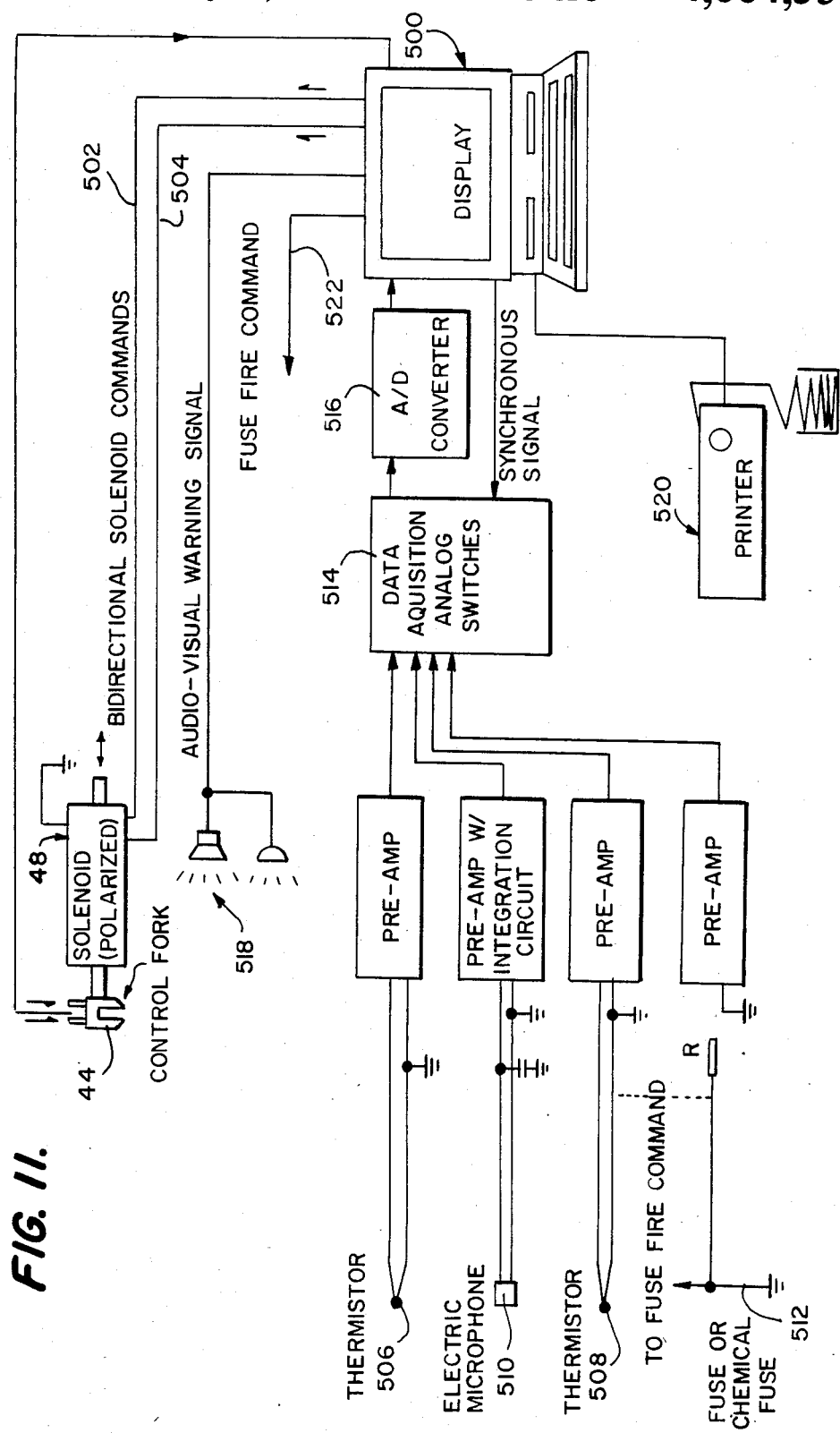
FIG. 11 is a block diagram illustrating monitoring means for the serial safety bearing assemblies of the present invention.

Referring to FIG. 11 there is diagramatically illustrated typical control means for bi-directional serial safety bearing illustrated in FIGS. 1, 2 and 2a. In FIG. 11 the clutch actuating fork is designated 44 which is connected to the polarized bi-directional solenoid 48.

The solenoid 48 is controlled via a microcomputer 500 via electrical leads 502 and 504. As known in the art the microcomputer is provided with software to set limits on the bearing working temperature, bearing noise, and operating time. Data for the software is provided by, for example, thermistor 506 embedded in, for example, the bearing seat to detect temperature and thermistor 508 in the circulation system for lubricant for the bearing. Further data is provided by the electric microphone 510 mounted on or adjacent to the bearing to monitor bearing noise level. Also illustrated is a fuse for the clutch actuator designated 512. Signals from these units are directed to the data acquisition-analog switches and A/D converter 514 and 516. Outputs from the microcomputer also include an electric signal for the audio-visual warning system generally designated 518. Where desired, output from the computer may also be directed to a printer 520 and an output from the computer as indicated at 522 may be directed to an electric fuse where an electric fuse type actuator is employed.

It will be understood by those skilled in the art that the serial safety bearing principles of the present invention may be equally applied to thrust, radial-thrust, joined, hydrodynamic, hydrostatic, aerodynamic as well as magnetic bearings, etc.

What is claimed:

1. A serial safety bearing assembly comprising an inner bearing ring; and outer bearing ring concentric to the inner bearing ring; and intermediate bearing ring between the inner and outer bearing rings; anti-friction bearings between the inner ring and the outer ring; a transversely movable clutch element splined to the intermediate bearing ring; a clutch plate mounted to rotate with the inner bearing ring and aligned with the clutch element; and clutch element actuating means.

2. The serial safety bearing assembly as defined in claim 1 wherein said outer bearing ring has a clutch plate mounted to rotate with the outer bearing ring and the clutch actuating element is movable toward either of the clutch plates.

3. A serial safety bearing assembly as defined in claim 2 wherein the clutch element actuating means comprises a polarized bi-directional solenoid.

4. A serial safety bearing assembly as defined in claim 1 wherein said clutch element is spring biased toward said clutch plate and latch means normally holding said clutch element away from said clutch plate.

5. A serial safety bearing assembly as defined in claim 4 wherein said latch is movable to a clutch actuating position by a solenoid.

6. A serial safety bearing assembly as defined in claim 5 including second latch means for holding the latch away from said clutch element upon actuation of the said solenoid.

7. A serial safety bearing assembly as defined in claim 1 including spring means normally urging said clutch element into engagement with said clutch plate and a fusible link holding said clutch element out of engagement with the clutch plate.

8. A serial safety bearing assembly as defined in claim 7 wherein the fusible element is electrically released.

9. The serial safety bearing assembly as defined in claim 1 wherein the clutch element is spring urged toward the clutch plate and held out of engagement with the clutch plate by a pivoting latch member.

10. The serial safety bearing assembly as defined in claim 9 wherein the pivoting latch member is spring urged into the unlatched position.

11. The serial safety bearing assembly as defined in claim 10 wherein such spring urged pivoting latch member is held in the latch position by controlled destructive means.

12. The serial safety bearing assembly as defined in claim 11 wherein the control destructive means comprises a metallic pin surrounded a chemical etchant.

13. The serial safety bearing assembly as defined in claim 11 wherein the controlled destructive means comprises an anode and a cathode and an electro lytic solution surrounding said anode and cathode.

14. The serial safety bearing assembly as defined in claim 11 wherein said controlled destructive means comprises an explosive bolt.

15. The serial safety bearing assembly as defined in claim 1 wherein said clutch element and said clutch plate are provided with conical surfaces to assure concentricity when the clutch element is actuated.

* * * * *